Jan. 1, 1952
J. LA FLEUR
2,581,192
EXTENSIBLE TRAILER CABIN
Filed June 30, 1949
4 Sheets-Sheet 1
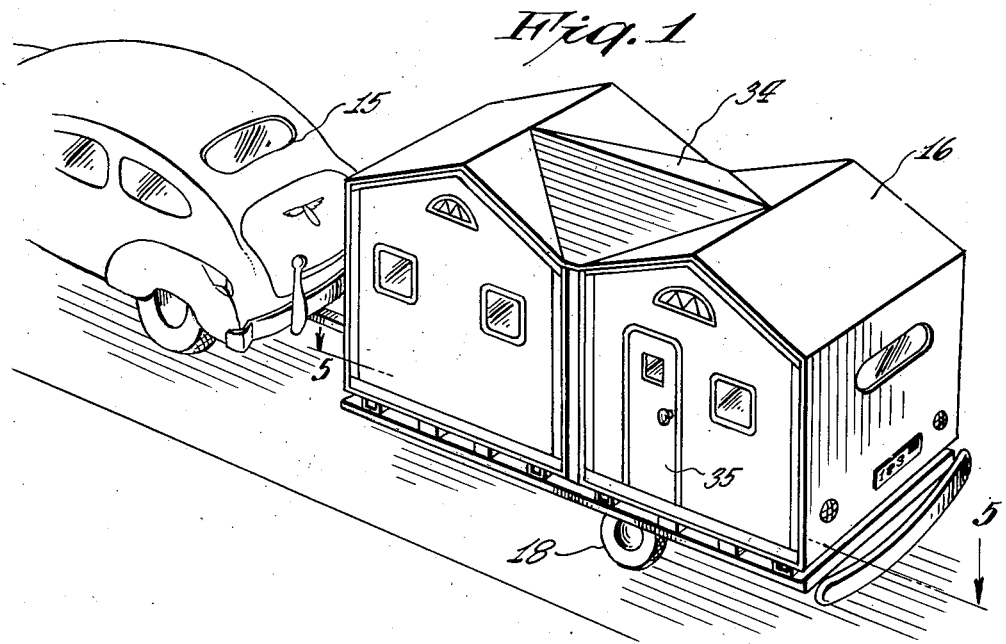
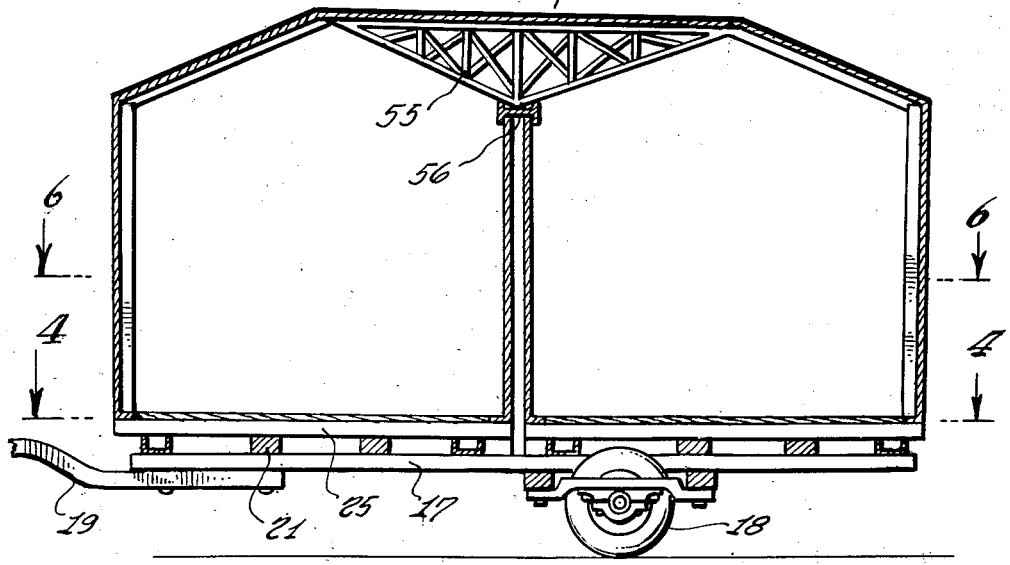
INVENTOR.
JOHN LA FLEUR
BY J. Lederman
ATTORNEY

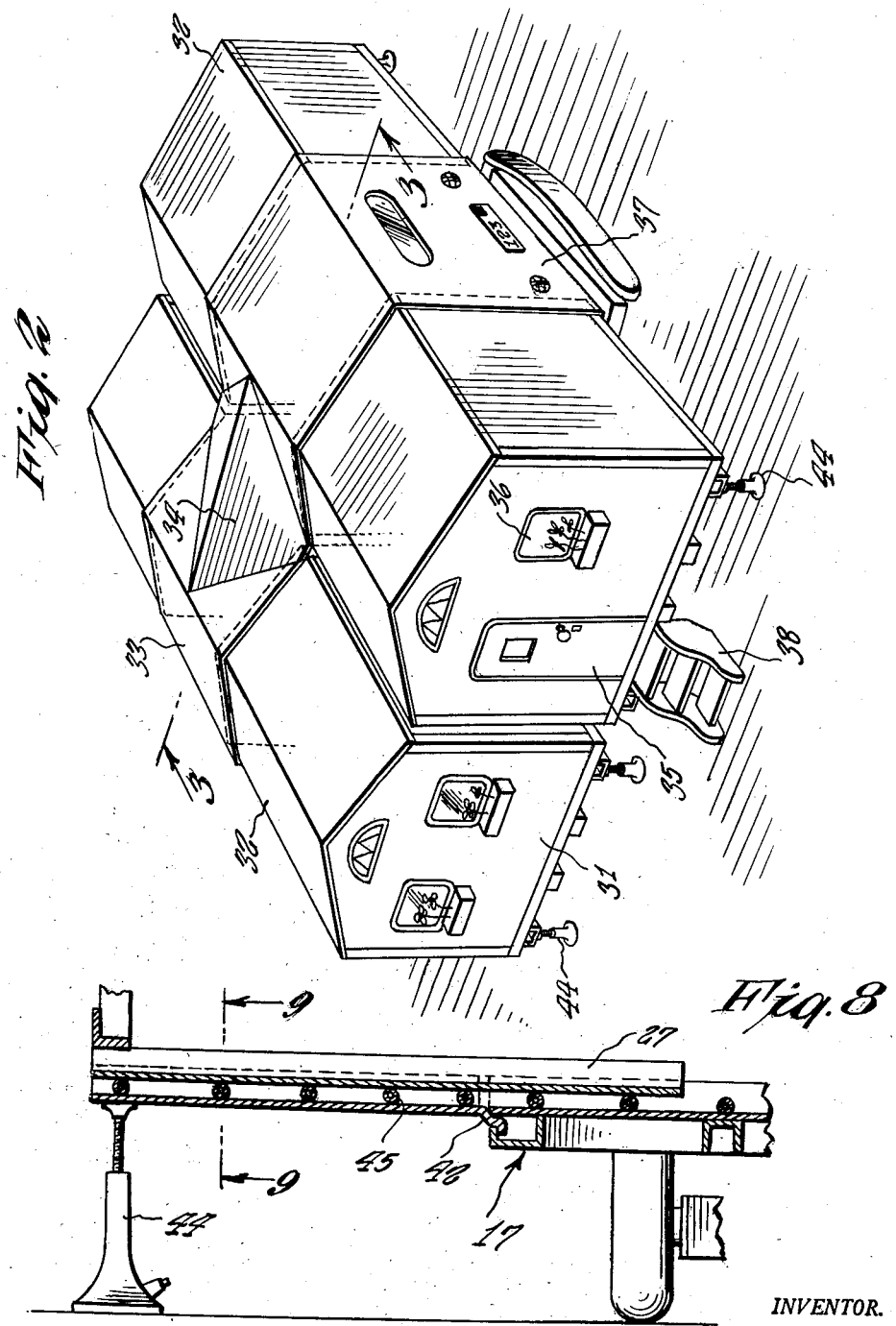

Jan. 1, 1952    J. LA FLEUR    2,581,192
EXTENSIBLE TRAILER CABIN
Filed June 30, 1949    4 Sheets-Sheet 3

INVENTOR.
JOHN LA FLEUR
BY J. Ledermann
ATTORNEY

Jan. 1, 1952        J. LA FLEUR        2,581,192
EXTENSIBLE TRAILER CABIN
Filed June 30, 1949                        4 Sheets-Sheet 4
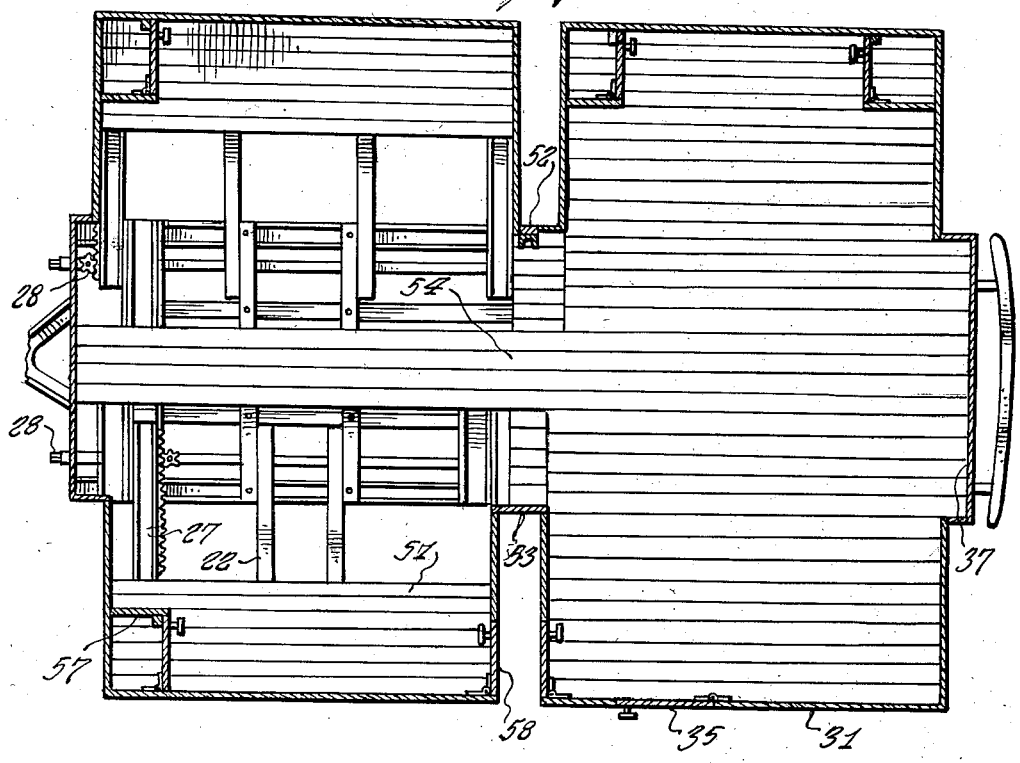
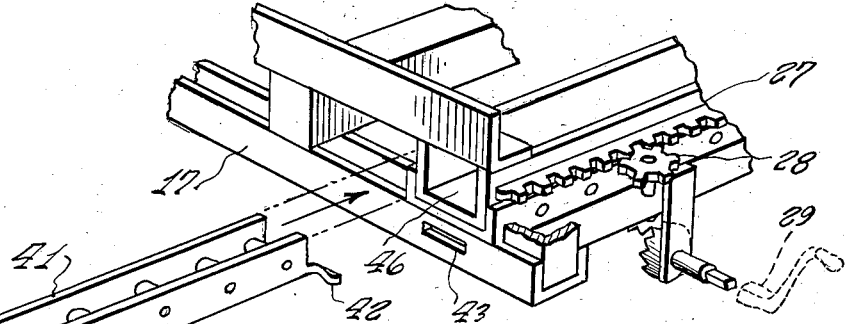
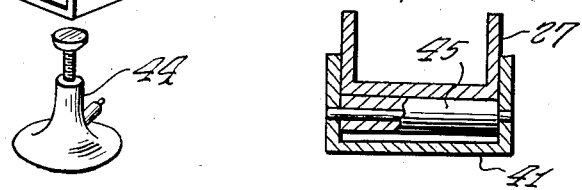
INVENTOR.
JOHN LA FLEUR
BY
ATTORNEY

UNITED STATES PATENT OFFICE 2,581,192

EXTENSIBLE TRAILER CABIN

John La Fleur, Poolville, N. Y.

Application June 30, 1949, Serial No. 102,221

1 Claim. (Cl. 20—2)

This invention relates to trailer cabins.

It is an object of the present invention to provide a trailer having a cabin constructed thereon in such a manner that portions of the same can be extended to provide additional rooms and large floor space, the operation in effecting the extension of the portions of the cabin structure being in the nature of the hand crank operable through gearing upon a rack arrangement on the room extension portions to cause the inward and outward movement thereof. When the cabin has thus been extended it can serve as a permanent home.

It is another object of the present invention to provide on a single trailer a double cabin arrangement wherein a connecting passage is provided between separate cabins to connect the same together and at the same time to provide separated rooms.

Other objects of the present invention are to provide a trailer cabin arrangement which is of simple construction, inexpensive to manufacture, easy to adjust and operate, pleasing in appearance and efficient in operation.

For other objects and for a better understanding of the invention, reference may be had to the following detailed description taken in connection with the accompanying drawing, in which Fig. 1 is a perspective view of the trailer cabin with the parts thereof retracted and the trailer connected to an automobile for the purpose of being transported.

Fig. 2 is a perspective view of the trailer cabin with the parts thereof fully extended.

Fig. 3 is a longitudnial sectional view of the cabin taken on line 3—3 of Fig. 2

Fig. 6 is a transverse sectional view taken on line 6—6 of Fig. 3

Fig. 7 is a perspective and fragmentary view of certain of the operating parts of the trailer cabin.

Fig. 8 is a fragmentary transverse sectional view taken on line 8—8 of Fig. 4.

Fig. 9 is an enlarged sectional view taken on line 9—9 of Fig. 8.

Figure 4:
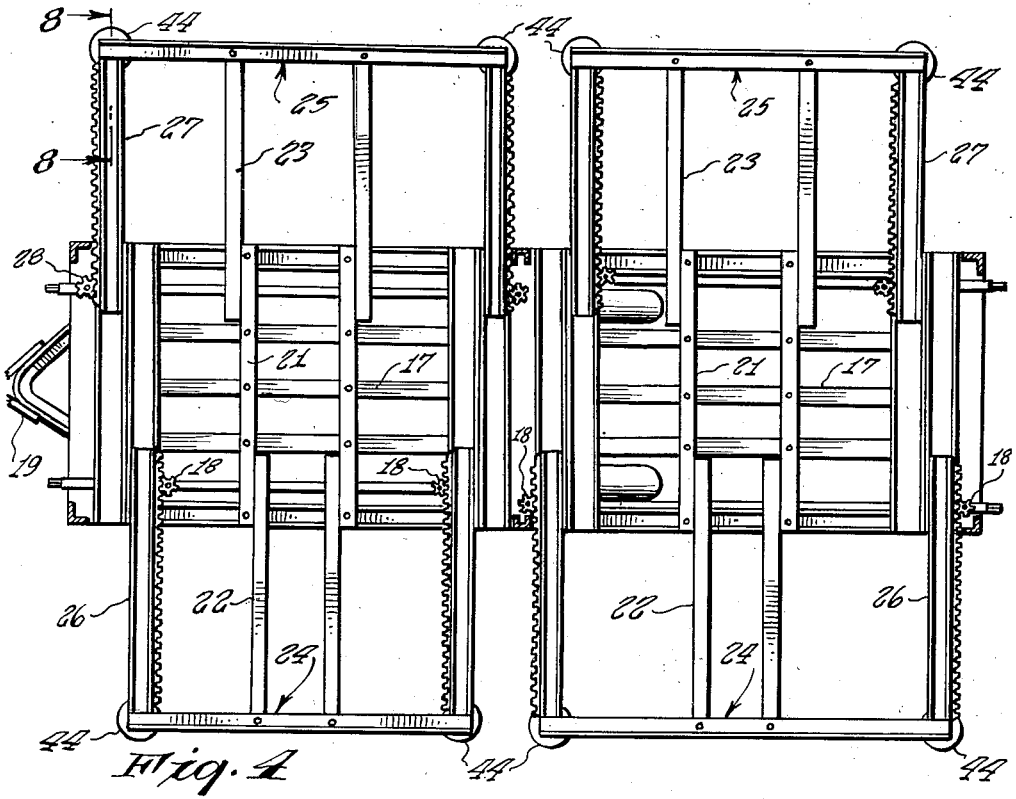
Fig. 4 is a transverse sectional view taken on line 4—4 of Fig. 3
Figure 5:
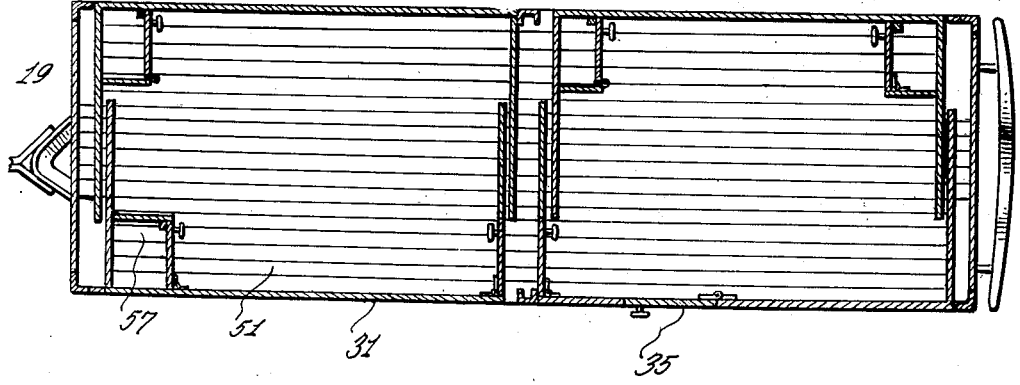
Fig. 5 is a transverse sectional view taken on line 5—5 of Fig. 1.

Referring now to the figures, 15 represents an automobile to which a trailer cabin arrangement 16 is attached. This trailer cabin arrangement has a main base frame structure 17 to which supporting wheels 18 are connected for the purpose of supporting the trailer. The forward end of the frame may be connected to the automobile 15 through a hitch bar 19. On the frame 17 are transverse members 21 beside which and at one side of the trailer are adjustable members 22 and at the opposite side of the trailer adjustable members 23. These members form a part of adjustable floor extensions 24 and 25 respectively. These frames further include respectively channel rack bars 26 and 27. A pinion arrangement 28 which can be operated by a crank 29 connects with the racks so that the floor sections can be adjusted in or out. These floor sections are movable outwardly from the sides of the trailer. There are two pairs of floor sections arranged longitudinally of the trailer. The numerals above related in connection with these floor sections apply to both pairs of the same.

Secured to these floor sections are wall and roof portions 31 and 32. Over the main part of the trailer is a pair of roof portions 33 which are connected longitudinally of the trailer by an intermediate roof portion 34. The roof portions 32 extend outwardly from the opposite sides of the portion 33. These roof portions will fit in concentric relationship within one another. The wall portion 31 may have a door 35 and windows 36. The main part of the trailer has a rear wall 37 lying above the main bumper. Steps 38 lead from the door 35.

To support the floor sections in their extended positions, there are provided channel extension support bars 41 having a depending lug 42 which is extended into a hole 43 in the frame 17. A lifting jack 44 is provided beneath the end of the channel 41. This channel 41 has a series of rollers 45 for supporting the extension rack channels 46 and to facilitate their outward movement when the crank 29 is turned to operate the pinion gear arrangement 28 and the rack bar 27.

When the floor frames have been extended, there can be placed over the same a plurality of floor boards cut to the desired length and as indicated at 51.

Beneath the intermediate roof 34 there is provided closing walls 52 and 53 and a walking space 54 connecting the two cabin portions together. The intermediate roof portion 34 is supported by a truss 55, Fig. 3, bearing upon a transverse eye beam 56.

The floor layout may contain, when the floor boards are in place, several small closets 57. Small doors 58 are provided upon the wall extensions and can be used to gain passage between the extensions when it is not desired to use the passage space 54 extending beneath the main or intermediate roof 34, Fig. 6.

When it is desired to return the extensions to the main part of the trailer, the crank is rotated in the reverse direction so that the racks of the floor sections will be pulled inwardly. Thereafter the supporting members 41 will be lifted from the openings 43 and placed in the trailer. Likewise the jacks can be independently disposed in the trailer. The steps 38 can be lifted and will likewise be put in the trailer.

It will be apparent that there has been provided a trailer cabin arrangement wherein the sides of the cabin can be easily and quickly extended by the simple operation of cranking a gear arrangement and wherein there is provided between the front and rear portions of the cabin a passageway to permit one to move from one portion to the other.

While various changes may be made in the detail contruction, it shall be understood that such changes shall be within the spirit and scope of the present invention as defined by the appended claim.

For example, in actual use, there will be three feet of flooring that will be stationary on all outside sections, so as not to have to move any of the furniture that may be placed on the outside flooring. Also, two feet of stationary flooring will be provided in the center of each cabin.

The whole four sections may be extended either three or six feet outward to suit the convenience of the occupant, thereby, when extended outward, providing a complete modern bungalow home fourteen feet or twenty feet wide, by whatever the desired length may be, since the floor panels will be in three foot-wide strips. Also, there will be sections of lattice provided on all sections at the bottom, to make the structure attractive when extended outward. When in closed position, this trailer can be used just the same as any house trailer.

What is claimed is:

A cabin arrangement comprising a main supporting frame, front and rear main cabin portions extending laterally across the main frame and open between each other to provide a passage therebetween, each of said main cabin portions having gable roof formations, a transverse roof beam lying between the cabin portions, a truss beam supported upon said transverse beam and extending longitudinally of the main frame and extending between the gable ridges of the respective gable roof formations of the main cabin portions, an intermediate roof portion extending over the truss member and between the ridges of the respective gable roof formations of the main portions, said main frame having transverse channel pieces, extendible floor sections having rack bars slidable through the channel pieces, longitudinally extending pinion gear means for operating the rack members of the extendible floor sections, said extendible floor sections being extendible out of the respective outer ends of the front and rear main cabin portions, each of said extendible floor sections having end and side wall formations and gable roof formations lying therebetween and adjustable out of the gable roof formations of the cabin portions, each of said floor sections thereby providing separate rooms within the cabin, said frame having floor boards extending the full length thereof fixed to the frame, each of said floor sections having fixed boards on the outer ends thereof and removable boards for each of the sections adapted to lie, when in place, between the central boards of the main frame and the fixed boards of the respective adjustable floor sections.

JOHN LA FLEUR.

REFERENCES CITED

The following references are of record in the file of this patent:

UNITED STATES PATENTS

| Number | Name | Date |
|---|---|---|
| 1,156,693 | Koger | Oct. 12, 1915 |
| 1,521,635 | Lewis | Jan. 6, 1925 |
| 2,136,130 | Garlenko | Nov. 8, 1938 |

FOREIGN PATENTS

| Number | Country | Date |
|---|---|---|
| 304,802 | Great Britain | Jan. 28, 1929 |
| 447,229 | Germany | July 19, 1927 |
| 585,382 | Great Britain | Feb. 5, 1947 |
| 823,427 | France | Oct. 18, 1937 |